United States Patent
Wang et al.

(10) Patent No.: US 11,333,926 B1
(45) Date of Patent: May 17, 2022

(54) BACKLIGHT MODULE AND DISPLAY DEVICE

(71) Applicants: Beijing BOE Optoelectronics Technology Co., Ltd., Beijing (CN); BOE Technology Group Co., Ltd., Beijing (CN)

(72) Inventors: Yaodong Wang, Beijing (CN); Qin Xin, Beijing (CN); Yangli Zheng, Beijing (CN); Xiaoping Zhang, Beijing (CN); Jian Ren, Beijing (CN); Luo Zhang, Beijing (CN); Siqi Yin, Beijing (CN); Fangyi Liu, Beijing (CN); Litao Fan, Beijing (CN); Zhenguo Zhou, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/499,146

(22) Filed: Oct. 12, 2021

(30) Foreign Application Priority Data

Nov. 27, 2020 (CN) .......................... 202022796311.7

(51) Int. Cl.
*G02F 1/00* (2006.01)
*G02F 1/13357* (2006.01)
*F21V 8/00* (2006.01)

(52) U.S. Cl.
CPC ..... *G02F 1/133606* (2013.01); *G02B 6/0025* (2013.01); *G02B 6/0073* (2013.01); *G02F 1/133603* (2013.01); *G02F 1/133605* (2013.01)

(58) Field of Classification Search
CPC ............... G02B 6/0025; G02B 6/0073; G02F 1/133603; G02F 1/06; G02F 1/05
See application file for complete search history.

(56) References Cited

U.S. PATENT DOCUMENTS

| | | | |
|---|---|---|---|
| 2010/0053939 A1* | 3/2010 | Fan ...................... | G02B 6/0025 362/97.3 |
| 2011/0085110 A1* | 4/2011 | Lin ................... | G02F 1/133606 349/64 |
| 2014/0369068 A1* | 12/2014 | Sakamoto ............ | G02B 6/0025 362/609 |
| 2016/0077247 A1* | 3/2016 | Nakamura ............... | G02B 1/04 359/599 |
| 2019/0265549 A1* | 8/2019 | Chen ................. | G02F 1/133605 |
| 2020/0041846 A1* | 2/2020 | Mizuguchi ........ | G02F 1/133606 |

* cited by examiner

*Primary Examiner* — Gerald J Sulfleta, II
(74) *Attorney, Agent, or Firm* — IPRO, PLLC

(57) ABSTRACT

The disclosure relates to the technical field of liquid crystal display, and discloses a backlight module and a display device. The backlight module includes a light guide plate and a plurality of light emitting diodes arranged in a first direction, where the light guide plate is provided with a first region and a second region along a second direction, and the first direction and the second direction intersect with each other; and dots of the first region include a plurality of isolated cluster structures, and a dot density between any two adjacent cluster structures is lower than a dot density of each of the cluster structures.

10 Claims, 5 Drawing Sheets

BACKLIGHT MODULE AND DISPLAY DEVICE

The present disclosure claims the priority from Chinese Patent Application No. 202022796311.7, filed with the Chinese Patent Office on Nov. 27, 2020, and entitled "BACKLIGHT MODULE AND DISPLAY DEVICE", which is hereby incorporated by reference in its entirety.

FIELD

The disclosure relates to the technical field of liquid crystal display, and more particularly, relates to a backlight module and a display device.

BACKGROUND

With the development of technology, the application of liquid crystal display devices is increasingly common.

In the related art, in order to avoid the phenomenon that light is weaker between two adjacent light emitting diodes (LEDs), and light emitting regions of the light emitting diodes are brighter in a backlight module, and in order to optimize a display effect, a distance from an intersection of the light emitting regions of the two adjacent light emitting diodes to a viewable area can only be increased to balance the brightness between the two light emitting diodes and the brightness of the light emitting regions of the light emitting diodes.

SUMMARY

The disclosure provides the following technical solutions.

A backlight module includes a light guide plate having a light entering side and a light emitting surface, a plurality of light emitting diodes arranged in a first direction are arranged at the light entering side, and two adjacent light emitting diodes are arranged at intervals in the first direction; the light guide plate is provided with a first region and a second region along a second direction, and the first direction and the second direction intersect with each other; a length of the first region in the second direction is 0.6-1.8 times a gap between any two adjacent light emitting diodes; dots of the first region include a plurality of isolated cluster structures, a dot density between any two adjacent cluster structures is lower than a dot density of each of the cluster structures, a distance of any two adjacent cluster structures in the first direction is 0.7-1.0 times a length of each of the light emitting diodes in the first direction; and in the second direction, a length of each cluster structure is equal to the length of the first region.

The second region of the light guide plate is positioned between the first region and the viewable region, and a dot density of the cluster structures is greater than a dot density of the viewable region.

According to the backlight module provided by the disclosure, light transmitted to the viewable region via the cluster structures is increased because the dot density between any two adjacent cluster structures is lower than the dot density of each of the cluster structures, thereby increasing brightness between two adjacent light emitting diodes; and light transmitted between two adjacent cluster structures to the viewable region is reduced, thereby decreasing the brightness of the light emitting regions of the light emitting diodes.

This arrangement mode eliminates the need to increase the distance from the intersection of the light emitting regions of the two adjacent light emitting diodes to the viewable region; and by simply enabling the dot density between any two adjacent cluster structures to be lower than the dot density of each of the cluster structures, the brightness between the two adjacent light emitting diodes can be increased and the brightness of the light emitting regions of the light emitting regions can be decreased, so that the display effect can be optimized in the case of the smaller frame of the backlight module.

Optionally, the first direction and the second direction are perpendicular to each other; the length of the first region in the second direction is 0.8-1.0 times the gap of the two adjacent light emitting diodes; and distances from a midpoint of any one of the cluster structures to the light emitting diodes adjacent to the any one cluster structure are identical, a dot density at any location, having a same distance from the two adjacent light emitting diodes, of the any one cluster structure is greater than dot densities at other locations of the any one cluster structure; and the dot density gradually decreases from the any location to an edge location of the any one cluster structure.

Optionally, the backlight module further includes a diffusion sheet opposite to the light emitting surface; the diffusion sheet has a plurality of light-shielding dots thereon, orthographic projections of the plurality of light-shielding dots on the light guide plate are positioned in the first region and are opposite to the light emitting diodes; and a density of the plurality of light-shielding dots gradually decreases from a center to an edge location.

Optionally, the backlight module further includes the diffusion sheet opposite to the light emitting surface; the diffusion sheet has a plurality of light-shielding dots thereon, orthographic projections of the plurality of light-shielding dots on the light guide plate are positioned in the first region and are opposite to the light emitting diodes; a density of the plurality of light-shielding dots gradually decreases from a center to an edge location; and an orthographic projection, near an edge of each of the plurality of light emitting diodes, of an outline of the light-shielding dots on the light guide plate is an arc convex towards the each light emitting diode.

Optionally, the backlight module further includes a flexible circuit board; the plurality of light emitting diodes are positioned on the flexible circuit board; on the flexible circuit board, a light emitting region of each of the plurality of light emitting diodes is processed by a dark color or is attached with a dark tape to form a plurality of light absorbing regions; a length of each of the plurality of light absorbing regions in the first direction is equal to the length of the each light emitting diode in the first direction, and a length of each of the plurality of light absorbing regions in the second direction is less than the length of the first region in the second direction.

Optionally, the backlight module further includes a reflective sheet; the reflective sheet is positioned on a side, away from the light emitting surface, of the light guide plate; an edge of the reflective sheet is provided with a plurality of grooves; the plurality of grooves are arranged in one-to-one correspondence with the plurality of light absorbing regions; and orthographic projections of the light absorbing regions on the reflective sheet are positioned in the grooves.

The disclosure also provides a display device including any one of the above backlight modules.

Figure 1:
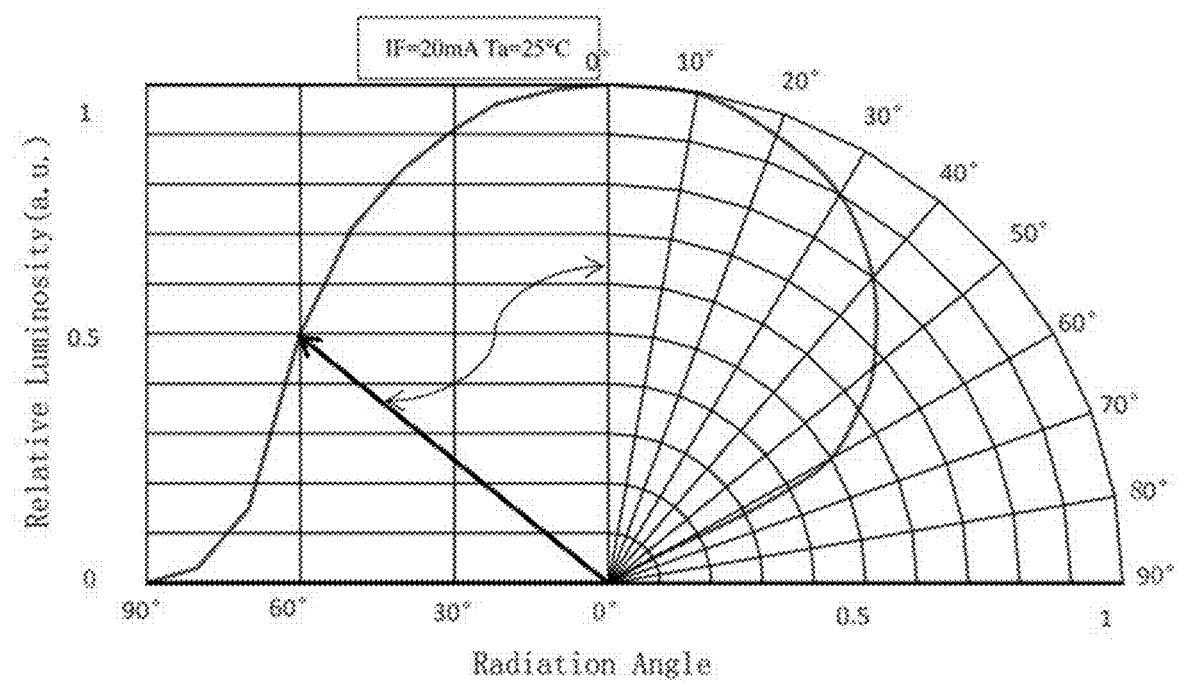
FIG. 1 is a schematic diagram of a relationship between a luminous angle and brightness of a light emitting diode.

Reference numerals: 1-light guide plate; 2-light emitting diode; 3-viewable region; 4-second region; 5-first region; 6-cluster structure; 7-groove; 8-diffusion sheet; 9-upper half region; 10-lower half region; 11-light absorbing region; 12-adhesive tape; 13-reflective sheet; 14-back plate; 15-flexible circuit board.

DETAILED DESCRIPTION OF THE EMBODIMENTS

The technical solutions of the embodiments of the disclosure will now be clearly and fully described in conjunction with the accompanying drawings of the embodiments of the disclosure, and it will be apparent that the embodiments described are only some, but not all, embodiments of the disclosure. Based on the embodiments in the disclosure, all other embodiments obtained by a person of ordinary skill in the art without creative effort fall within the scope of protection of the disclosure.

The approach of increasing a distance from an intersection of the light emitting regions of the two adjacent light emitting diodes to a viewable area in the related art necessarily increase a size of a frame of the backlight module, and therefore, how to design a backlight module with a smaller frame has become a problem that is urgently solved.

Figure 2:
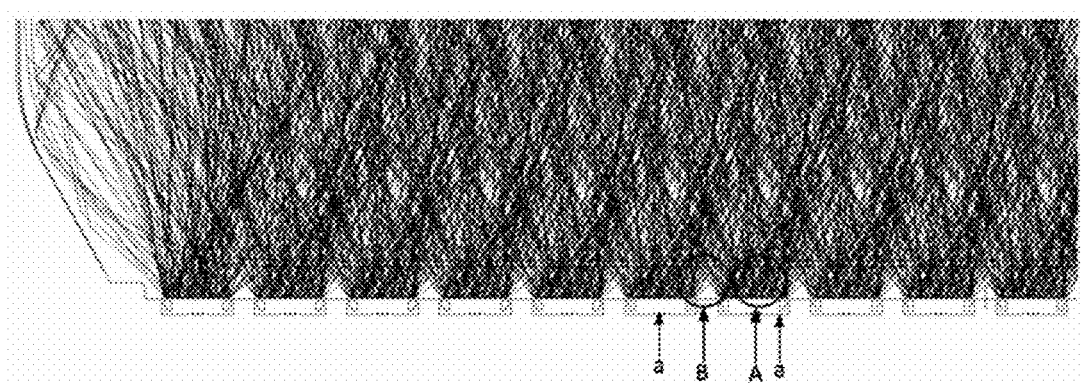
FIG. 2 is a simulation diagram of light paths of various light emitting diodes of a light bar of a backlight module in the related art.

FIG. 1 is a schematic diagram of a relationship between a luminous angle and brightness of a light emitting diode, and FIG. 2 is a simulation diagram of light paths of various light emitting diodes of a light bar of a backlight module in the related art. Referring to FIG. 1, a strong light region (a region indicated by curved double arrows in FIG. 1) is within a 120° cone (having a 60° included angle with a single light emitting surface perpendicular to the light emitting diodes) range, there is at least a 50% drop in light intensity of the light emitting diodes in the case of exceeding the 120° cone range, that is, when the included angle between the edge light-emitting surface of each of two adjacent light emitting diodes and the vertical direction is greater than 60°, the luminous brightness will be reduced. It is not enough to compensate the brightness of region B shown in FIG. 2 only by the light emitting diode structure. Therefore, referring to FIG. 2, for a backlight module with an ultra-narrow frame, a light emitting region A of a light emitting diode a has stronger light, and a region B between two adjacent light emitting diodes a has weaker light.

Figure 3:
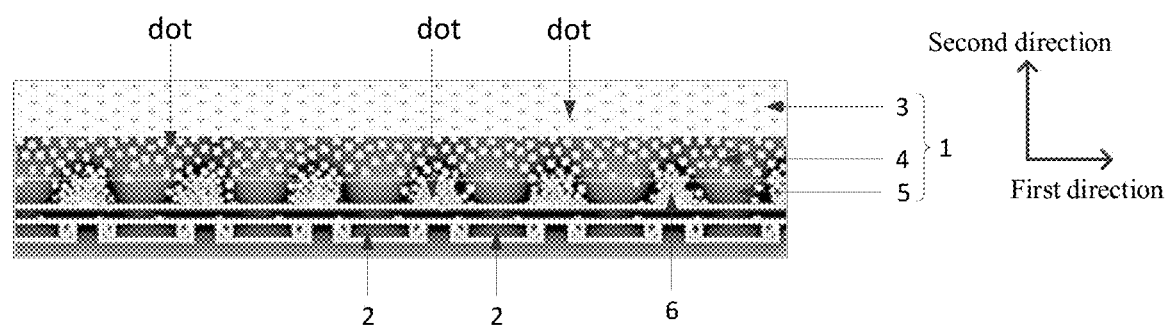
FIG. 3 is a structural schematic diagram of arrangement of dots with different densities on a light guide plate of a backlight module provided by an embodiment of the disclosure.

FIG. 3 is a structural schematic diagram of arrangement of dots with different densities on a light guide plate of a backlight module provided by an embodiment of the disclosure. As shown in FIG. 3, a backlight module provided by an embodiment of the disclosure includes a light guide plate 1 having a light entering side, and a light emitting surface, where a plurality of light emitting diodes 2 arranged in a first direction are arranged at the light entering side, and two adjacent light emitting diodes are arranged at intervals in the first direction; the light guide plate is provided with a first region 5 and a second region 4 along a second direction, and the first direction and the second direction intersect with each other; a length of the first region 5 in the second direction is 0.6-1.8 times a gap between any two adjacent light emitting diodes 2; dots of the first region 5 include a plurality of isolated cluster structures 6, a dot density between any two adjacent cluster structures 6 is lower than a dot density of the cluster structures 6, and a distance between any two adjacent cluster structures 6 in the first direction is 0.7-1.0 times a length of each of the light emitting diodes 2 in the first direction; and a length of each cluster structure 6 is equal to the length of the first region in the second direction.

According to the backlight module provided by the embodiment, light transmitted to a viewable region 3 via the cluster structures is increased because the dot density between any two adjacent cluster structures 6 is lower than the dot density of each of the cluster structures 6, thereby increasing brightness between the two adjacent light emitting diodes 2. Light transmitted between the two adjacent cluster structures 6 to the viewable region 3 is reduced, thereby decreasing the brightness of the light emitting regions of the light emitting diodes 2.

This arrangement mode eliminates the need to increase a distance from an intersection of the light emitting regions of the two adjacent light emitting diodes 2 to the viewable region; and by simply enabling the dot density between any two adjacent cluster structures 6 to be lower than the dot density of each of the cluster structures 6, the brightness between the two adjacent light emitting diodes 2 can be increased and the brightness of the light emitting regions of the light emitting regions 2 can be decreased, so that a display effect can be optimized in the case of the smaller frame of the backlight module.

The second region 4 of the light guide plate 1 is positioned between the first region 5 and the viewable region 3, and the dot density of the cluster structure 6 is greater than a dot density in the viewable region 3.

Besides, a diameter of each dot is in a range between 0.03 mm and 0.05 mm, for example 0.038 mm; and the various dots have the same diameter.

In addition, the dots are arranged by filling of optical software. The arrangement mode may be that a certain number of dots are arranged in the light guide plate 1 with an area of 1 mm$^2$, and the more the number is, the greater the dot density of the light guide plate 1 with the area of 1 mm$^2$.

In some embodiments, the first direction and the second direction are perpendicular to each other; the length of the first region 5 in the second direction is 0.8-1.0 times the gap of the two adjacent light emitting diodes 2; and distances from a midpoint of any one of the cluster structures to the two light emitting diodes adjacent to the cluster structure are identical, a dot density at any location, having the same distance from the two adjacent light emitting diodes 2, of the any one cluster structure 6 is greater than dot densities at other locations of the cluster structure 6, and the dot density gradually decreases from the above any location to an edge location of the cluster structure 6.

Figure 4:
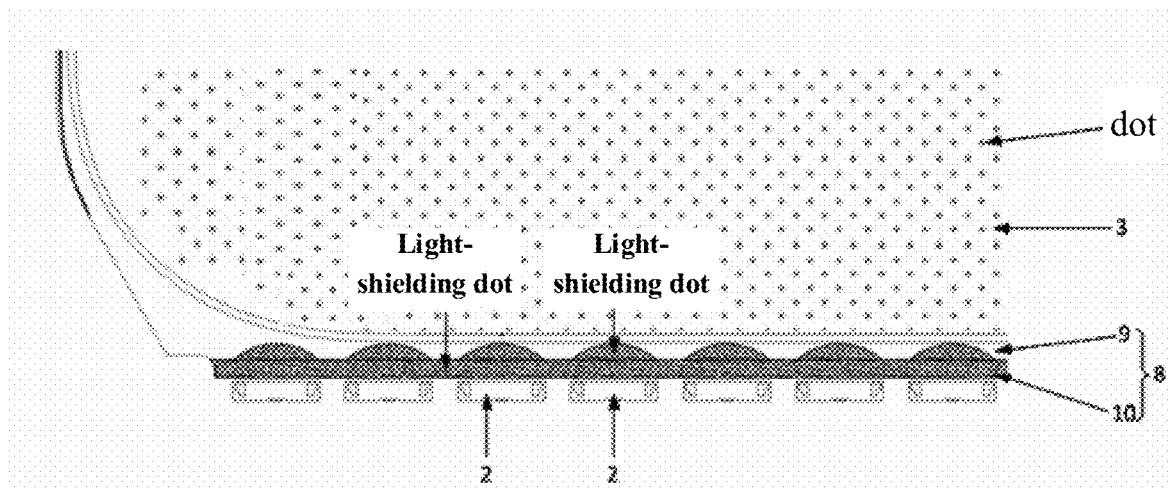
FIG. 4 is a structural schematic diagram of arrangement of light-shielding dots on a diffusion sheet of a backlight module provided by an embodiment of the disclosure.
Figure 5:
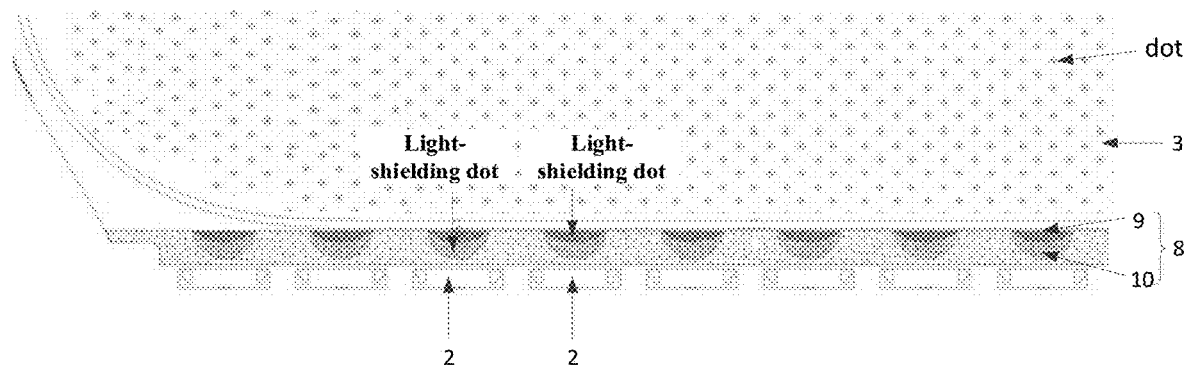
FIG. 5 is a structural schematic diagram of arrangement of light-shielding dots on a diffusion sheet of a backlight module provided by another embodiment of the disclosure.

FIGS. 4-5 are structural schematic diagrams of arrangement of light-shielding dots on a diffusion sheet of the backlight module provided by embodiments of the disclosure. Referring to FIG. 4, as an optional embodiment, the backlight module further includes a diffusion sheet 8 opposite to the light emitting surface; the diffusion sheet has a plurality of light-shielding dots thereon; orthographic projections of the light-shielding dots on the light guide plate 1 are positioned in the first region, and are opposite to the light emitting diodes; and the density of the light-shielding dots gradually decreases from the center to an edge location.

In the embodiments, the light-shielding dots play the role of absorbing light. Since the orthographic projections of the light-shielding dots on the light guide plate 1 are positioned in the first region 5 and are opposite to the light emitting diodes 2, when light passes through a region of the diffusion sheet 8 corresponding to the light emitting regions of the light emitting diodes 2, part of light is absorbed by the light-shielding dots to reduce the brightness of the light emitting regions of the light emitting diodes 2 due to the arrangement of the light-shielding dots in this region.

Therefore, this arrangement mode can further reduce brightness of the light emitting regions of the light emitting diodes 2, thereby further optimizing the display effect.

A diameter of each light-shielding dot is in a range between 0.03 mm and 0.05 mm, for example 0.05 mm; and the various dots have the same diameter.

In addition, the light-shielding dots are also arranged by filling of optical software. The arrangement mode may also be that a certain number of dots are arranged in the light guide plate 1 with an area of 1 mm$^2$, and the more the number is, the greater the density of the light-shielding dots of the light guide plate 1 with the area of 1 mm$^2$.

Besides, continue to refer to FIG. 4, the diffusion sheet 8 includes an upper half region 9 and a lower half region 10; and the light-shielding dots at an edge, far away from the lower half region 10, of the upper half region 9 are an arc.

Referring to FIG. 5, as an optional embodiment, the backlight module further includes the diffusion sheet 8 opposite to the light emitting surface; the diffusion sheet 8 has a plurality of light-shielding dots thereon, the orthographic projections of the light-shielding dots on the light guide plate 1 are positioned in the first region 5 and are opposite to the light emitting diodes 2; the density of the light-shielding dots gradually decreases from the center to the edge location; and an orthographic projection, near the edge of each of the light emitting diodes, of an outline of the light-shielding dots on the light guide plate 1 is an arc convex towards the light emitting diode 2.

Continue to refer to FIG. 5, in the embodiment, the diffusion sheet includes the upper half region 9 and the lower half region 10; the dot density of the lower half region 10 is less than the dot density of the upper half region 9; and the light-shielding dots, near an edge of each of the light emitting diodes 2, in the lower half region 10 are an arc convex towards the light emitting diode 2.

Figure 6:
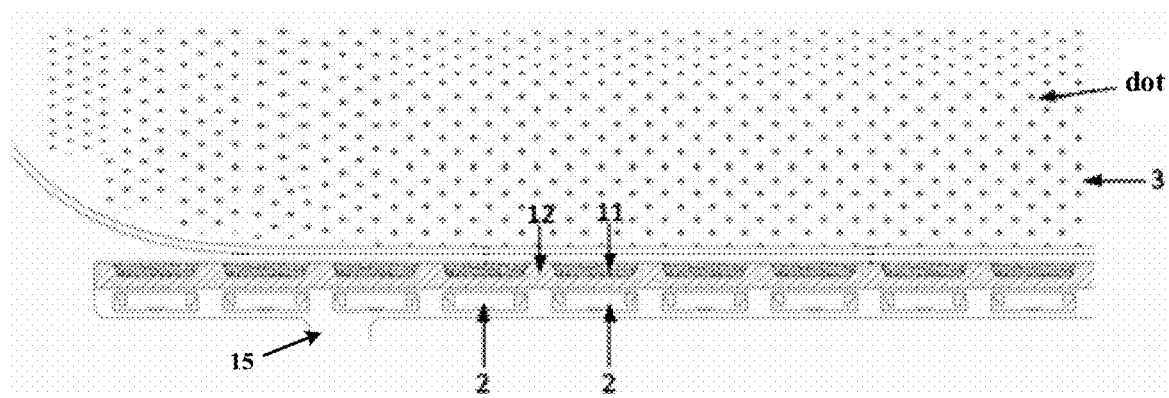
FIG. 6 is a structural schematic diagram of arrangement of light absorbing regions on a flexible circuit board of a backlight module provided by an embodiment of the disclosure.

FIG. 6 is a structural schematic diagram of arrangement of light absorbing regions on a flexible circuit board of the backlight module provided by an embodiment of the disclosure. Referring to FIG. 6, as an optional embodiment, the backlight module further includes a flexible circuit board 15; the light emitting diodes 2 are positioned on the flexible circuit board 15; on the flexible circuit board 15, the light emitting region of each light emitting diode 2 is processed by a dark color or is attached with the dark tape to form a plurality of light absorbing regions 11; the length of each light absorbing region 11 in the first direction is equal to the length of the light emitting diode 2 in the first direction, and the length of each light absorbing region in the second direction is less than the length of the first region 5 in the second direction. Optionally, the light emitting diodes 2 are positioned on the flexible circuit board 15, and the orthographic projection of the flexible circuit board on the light guide plate 1 does not overlap with the second region 4.

In the embodiment, the light absorbing regions 11 also play the role of absorbing light; and since the light absorbing regions 11 are arranged in regions, corresponding to the light emitting regions of the light emitting diodes 2, of the flexible circuit board 15, part of light is absorbed by the light absorbing regions 11 through the light emitting regions of the light emitting diodes 2, thereby decreasing the brightness of the light emitting regions of the light emitting diodes 2.

Figure 7:
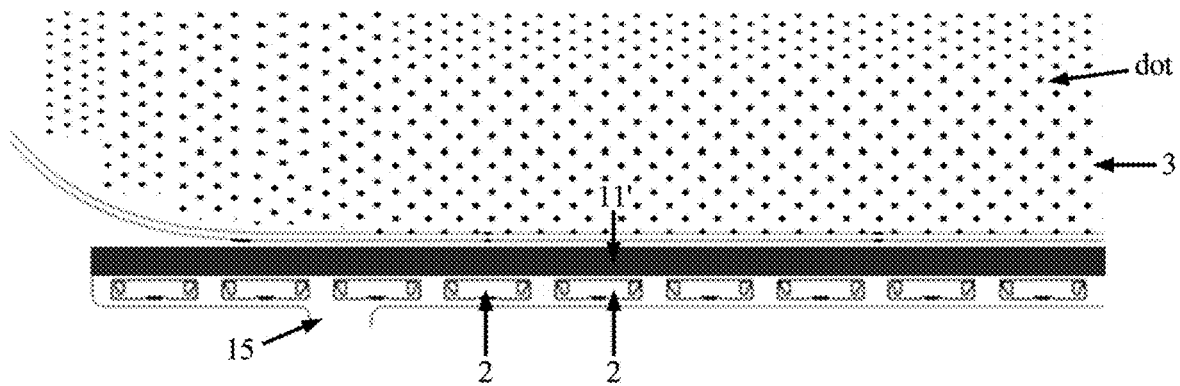
FIG. 7 is a structural schematic diagram of arrangement of whole silk-screen printing on the flexible circuit board of a backlight module provided by an embodiment of the disclosure.

As shown in FIG. 7, the whole silk-screen printing on the flexible circuit board 15 is performed, such as the region 11' of the flexible circuit board 15, and then a black and white double faced adhesive tape 12 is attached, as shown in FIG. 6, FIG. 6 is a structural schematic diagram of a backlight module after the black and white double faced adhesive tape is attached provided by an embodiment of the disclosure. A black side of the adhesive tape 12 is attached to the flexible circuit board 15 and a white side of the adhesive tape 12 is attached to the light guide plate 1, and the black and white double faced adhesive tape 12 is recessed in a region corresponding to the light emitting regions of the light emitting diodes 2 to expose the light absorbing regions 11, thereby absorbing light emitted by the light guide plate 1.

Figure 8:
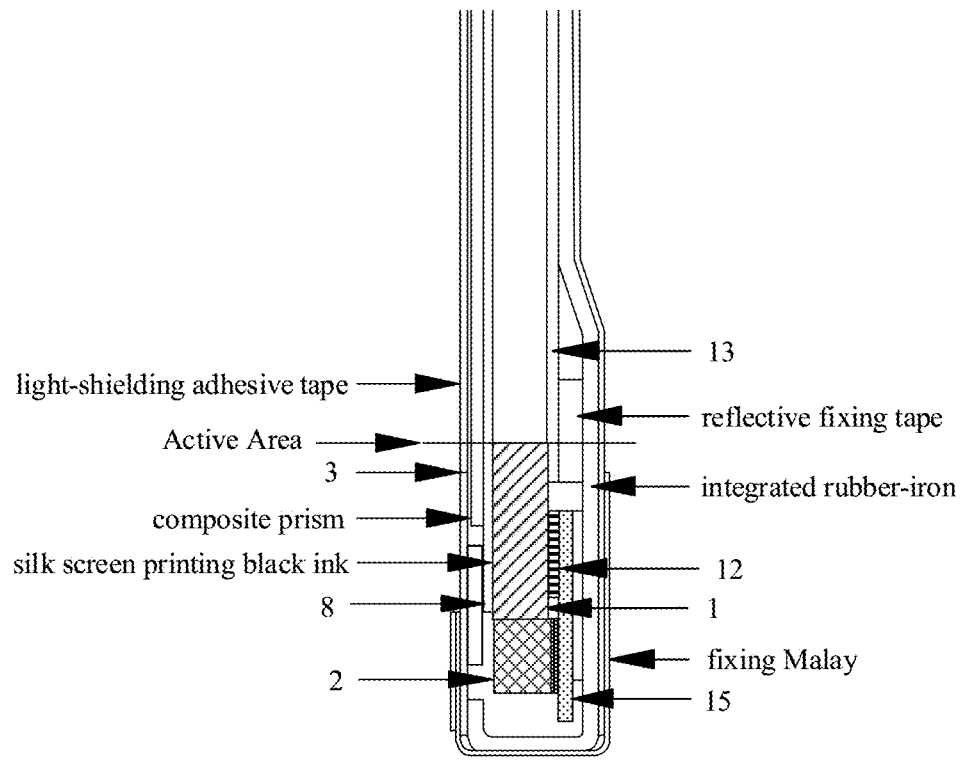
FIG. 8 is a structural schematic diagram of a sectional view of a backlight module provided by an embodiment of the disclosure.

FIG. 8 is a structural schematic diagram of a sectional view of a backlight module provided by an embodiment of the disclosure. As shown in FIG. 8, the black and white double faced adhesive tape 12 is arranged between the flexible circuit board 15 and the light guide plate 1; the dot structure of the light guide plate 1 is arranged at a side close to the flexible circuit board 15; the backlight module includes optical film sheets arranged at a side, facing away from the flexible circuit board 15, of the light guide plate 1, and the optical film sheets include the diffusion sheet 8 and the prism sheet; and the backlight module further includes the light-shielding adhesive tape arranged at a side, facing away from the light guide plate 1, of the optical film sheets.

Figure 9:
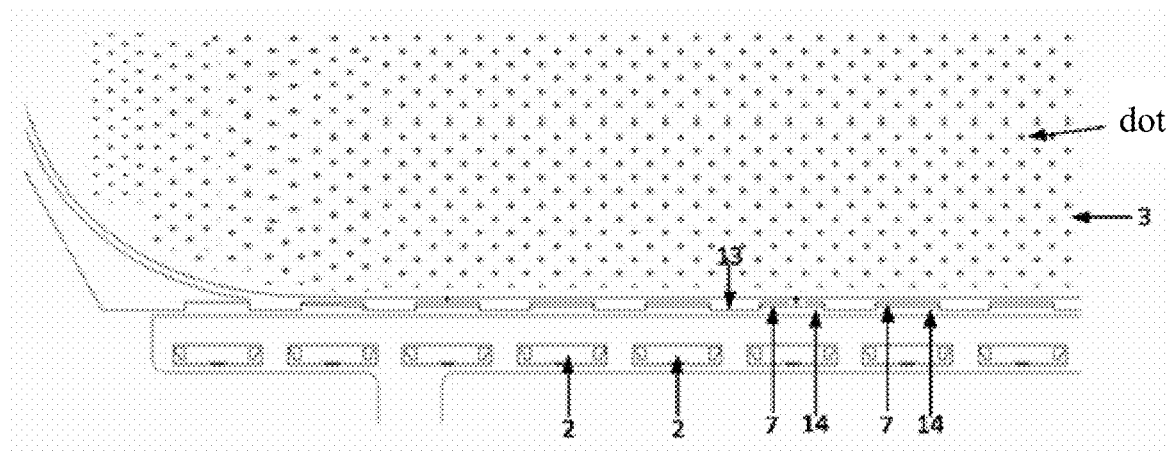
FIG. 9 is a structural schematic diagram of arrangement of grooves in a reflective sheet of a backlight module provided by an embodiment of the disclosure.

FIG. 9 is a structural schematic diagram of arrangement of grooves in a reflective sheet of the backlight module provided by an embodiment of the disclosure. Referring to FIG. 9, as an optional embodiment, the backlight module further includes a reflective sheet 13 which is positioned on a side, away from the light emitting surface, of the light guide plate 1; a plurality of grooves 7 are formed in an edge of the reflective sheet 13, the plurality of grooves 7 are arranged in one-to-one correspondence with the plurality of light absorbing regions 11, and orthographic projections of the light absorbing regions 11 on the reflective sheet 13 are positioned in the grooves 7.

To facilitate module mounting, a side, facing away from the light guide plate 1, of the reflective sheet 13 is provided with a back plate 14.

In the embodiment, since the grooves 7 are in one-to-one correspondence with the light emitting regions of the light emitting diodes 2, when the light emitting diodes 2 emit light towards the reflective sheet 13, light corresponding to the light emitting regions of the light emitting diodes 2 passes through the grooves 7 to irradiate to the back plate 14, and the back plate 14 absorbs a part of the light, which reduces light reflected to the viewable region 3, thereby decreasing the brightness of the light emitting regions of the light emitting diodes 2.

Therefore, this arrangement mode can further reduce brightness of the light emitting regions of the light emitting diodes 2, thereby further optimizing the display effect.

Figure 10:
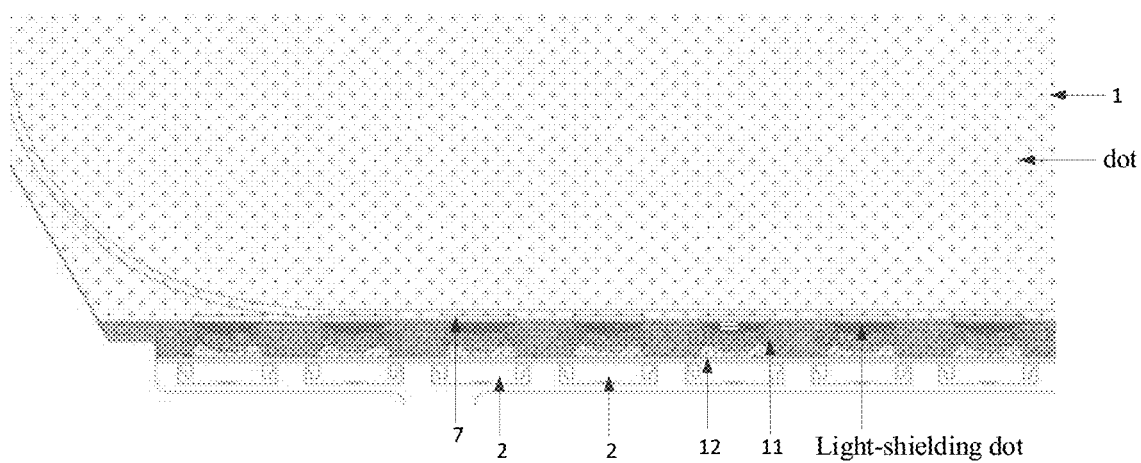
FIG. 10 is a structural schematic diagram of an overall backlight module provided by an embodiment of the disclosure.

FIG. 10 is a structural schematic diagram of the overall backlight module provided by an embodiment of the disclosure. Referring to FIG. 10, it can be visually seen that solutions of all the embodiments of the disclosure are combined together to maximally increase the brightness between the two adjacent light emitting diodes 2, and decrease the brightness of the light emitting regions of the light emitting diodes 2, thereby effectively optimizing the display effect.

An embodiment of the disclosure also provides a display device including any one of the above backlight modules.

In the embodiments, beneficial effects of the display device are the same as those of any one of the above backlight modules and will not be described in detail.

Obviously, those skilled in the art can make various modifications and variations to the present application without departing from the spirit and scope of the present application. Thus, the present application also intends to include these modifications and variations as far as these modifications and variations fall within the scope of the appended claims and equivalents thereof

What is claimed is:

1. A backlight module, comprising a light guide plate; wherein the light guide plate has a light entering side and a light emitting surface, a plurality of light emitting diodes arranged in a first direction are arranged at the light entering side, and two adjacent light emitting diodes of the plurality of light emitting diodes are arranged at intervals in the first direction;
   wherein the light guide plate has a first region and a second region along a second direction, and the first direction and the second direction intersect with each other;
   a length of the first region in the second direction is 0.6-1.8 times a gap between any two adjacent light emitting diodes of the plurality of light emitting diodes;
   dots of the first region comprise a plurality of isolated cluster structures, a dot density between any two adjacent cluster structures is lower than a dot density of each of the cluster structures, and a distance between any two adjacent cluster structures in the first direction is 0.7-1.0 times a length of each of the light emitting diodes in the first direction; and
   a length of each of the cluster structures is equal to the length of the first region in the second direction.

2. The backlight module according to claim 1, wherein the first direction and the second direction are perpendicular to each other;
   the length of the first region in the second direction is 0.8-1.0 times the gap of the two adjacent light emitting diodes; and
   distances from a midpoint of any one of the cluster structures to two light emitting diodes adjacent to the any one cluster structure are identical;
   a dot density at any location, having a same distance from the two adjacent light emitting diodes, of the any one cluster structure is greater than dot densities at other locations of the any one cluster structure; and
   the dot density gradually decreases from the any location to an edge location of the any one cluster structure.

3. The backlight module according to claim 2, further comprising a diffusion sheet opposite to the light emitting surface;
   wherein the diffusion sheet has a plurality of light-shielding dots thereon;
   orthographic projections of the plurality of light-shielding dots on the light guide plate are arranged in the first region and are opposite to the light emitting diodes; and
   a density of the plurality of light-shielding dots gradually decreases from a center to an edge location.

4. The backlight module according to claim 3, wherein the diffusion sheet comprises an upper half region and a lower half region; and the light-shielding dots at an edge, far away from the lower half region, of the upper half region are an arc.

5. The backlight module according to claim 4, a diameter of each of the light-shielding dots is in a range between 0.03 mm and 0.05 mm.

6. The backlight module according to claim 2, further comprising a diffusion sheet opposite to the light emitting surface;
   wherein the diffusion sheet has a plurality of light-shielding dots thereon;
   orthographic projections of the plurality of light-shielding dots on the light guide plate are arranged in the first region and are opposite to the light emitting diodes;
   a density of the plurality of light-shielding dots gradually decreases from a center to an edge location; and
   an orthographic projection, near an edge of each of the plurality of light emitting diodes, of an outline of the light-shielding dots on the light guide plate is an arc convex towards the each light emitting diode.

7. The backlight module according to claim 6, wherein the diffusion sheet comprises an upper half region and a lower half region; and
   the light-shielding dots, near the edge of each of the plurality of light emitting diodes, in the lower half region are an arc convex towards the each light emitting diode.

8. The backlight module according to claim 3, further comprising a flexible circuit board, wherein
   the plurality of light emitting diodes are arranged on the flexible circuit board;
   on the flexible circuit board, a light emitting region of each of the plurality of light emitting diodes is processed by a dark color or is attached with a dark tape to form a plurality of light absorbing regions; and
   a length of each of the plurality of light absorbing regions in the first direction is equal to the length of the each light emitting diode in the first direction, and a length of each of the plurality of light absorbing regions in the second direction is less than the length of the first region in the second direction.

9. The backlight module according to claim 8, further comprising a reflective sheet, wherein
   the reflective sheet is arranged on a side, away from the light emitting surface, of the light guide plate;

an edge of the reflective sheet is provided with a plurality of grooves;

the plurality of grooves are arranged in one-to-one correspondence with the plurality of light absorbing regions; and orthographic projections of the light absorbing regions on the reflective sheet are arranged in the grooves.

10. A display device comprising the backlight module according to claim 1.

* * * * *